United States Patent
Browne et al.

(10) Patent No.: US 7,594,697 B2
(45) Date of Patent: *Sep. 29, 2009

(54) ACTIVE MATERIAL ACTUATED HEADREST ASSEMBLIES

(75) Inventors: Alan L. Browne, Grosse Pointe, MI (US); Adrian B. Chernoff, Boulder, CO (US); Rainer A. Glaser, Washington, MI (US); Nancy L. Johnson, Northville, MI (US); James Y. Khoury, Macomb, MI (US); Ukpai I. Ukpai, Columbus, IN (US); Pablo D. Zavattieri, Ann Arbor, MI (US)

(73) Assignee: GM Global Technology Operations, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 12/210,188

(22) Filed: Sep. 13, 2008

(65) Prior Publication Data

US 2009/0008973 A1    Jan. 8, 2009

Related U.S. Application Data

(62) Division of application No. 11/736,086, filed on Apr. 17, 2007, now Pat. No. 7,448,678.

(60) Provisional application No. 60/792,520, filed on Apr. 17, 2006.

(51) Int. Cl.
*B60N 2/42* (2006.01)
*B60R 21/055* (2006.01)
*A47C 7/38* (2006.01)

(52) U.S. Cl. .................................................. 297/216.12
(58) Field of Classification Search ............. 297/216.12
See application file for complete search history.

(56) References Cited

U.S. PATENT DOCUMENTS

| | | | | |
|---|---|---|---|---|
| 5,290,091 | A * | 3/1994 | Dellanno et al. | 297/216.12 X |
| 5,694,320 | A * | 12/1997 | Breed | 297/216.12 X |
| 5,769,489 | A * | 6/1998 | Dellanno | 297/216.12 X |
| 5,961,182 | A * | 10/1999 | Dellanno | 297/216.12 |
| 6,088,640 | A * | 7/2000 | Breed | 297/216.12 X |
| 6,158,812 | A * | 12/2000 | Bonke | 297/216.12 X |
| 6,213,548 | B1 * | 4/2001 | Van Wynsberghe et al. | 297/216.12 |
| 6,331,014 | B1 * | 12/2001 | Breed | 297/216.12 X |
| 6,746,078 | B2 * | 6/2004 | Breed | 297/216.12 |
| 6,805,404 | B1 * | 10/2004 | Breed | 297/216.12 |
| 6,863,343 | B2 * | 3/2005 | Pal et al. | 297/216.12 |
| 7,048,334 | B2 * | 5/2006 | Pal et al. | 297/216.12 |
| 7,448,678 | B2 * | 11/2008 | Browne et al. | 297/216.12 |
| 2002/0060482 | A1 * | 5/2002 | Sakakibara et al. | 297/216.12 |
| 2007/0182146 | A1 * | 8/2007 | Browne et al. | 297/216.12 X |

\* cited by examiner

*Primary Examiner*—Rodney B White

(57) ABSTRACT

A headrest assembly including active material drivenly coupled to a headrest component, such as for example, an interior frame member, bag, or gear device wherein the material is actuated upon receipt of an activation signal, and configured to morph, reposition, reduce the resistance of, change a modulus property of, or otherwise modify an engaging surface defined by the headrest when actuated, and autonomously restore the headrest upon the deactivation of the material.

6 Claims, 6 Drawing Sheets

ACTIVE MATERIAL ACTUATED HEADREST ASSEMBLIES

CROSS REFERENCE TO RELATED APPLICATIONS

The present application claims priority to U.S. Provisional Application No. 60/792,520 filed on Apr. 17, 2006, and is a divisional of U.S. Non-Provisional application Ser. No. 11/736,086, filed on Apr. 17, 2007 now U.S. Pat. No. 7,448, 678, and entitled "ACTIVE MATERIAL ACTUATED HEADREST ASSEMBLIES". The disclosures of said applications are hereby incorporated by reference in their entirety.

BACKGROUND

The present disclosure relates to a headrest assembly, and more particularly, to active material enabled morphable, positionable, and/or changeable/tunable compliance headrest assemblies.

Vehicle seats typically include a lower seat portion and a seatback portion. Headrest assemblies are commonly employed in vehicles and are typically adjustably attached to the seatback portion. Headrests may be selectively movable with respect to the seatback portion by a user; for example, the height of a headrest is often selectively adjustable.

BRIEF SUMMARY

Disclosed herein are headrest assemblies employing active material based actuators or employing active materials to provide changeable, tunable compliance of the headrest assembly. In one embodiment, the headrest comprises an active material incorporated in a frame member, a bag, or gear device, wherein the active material actuates when an activation signal is applied to the active material.

A headrest positioned to be aligned with a seated occupant's head, the headrest comprises one or more posts extending from a seatback; a padded covering having a surface configured to contact the occupant's head; a frame disposed within the padded covering; and an active material disposed within the padded covering in operative communication with a portion of the headrest surface that wherein the active material is configured to undergo a change in at least one property upon receipt of an activation signal, wherein the change in at least one property is effective to change a position of the headrest surface relative to the seatback or a modulus property.

In another embodiment, a headrest assembly comprises a central portion; a first wing portion coupled to one side of the central portion; and a second wing portion coupled to another side of the central portion. A frame supports and defines the wing and central portions and has interconnecting members formed of an active material. The active material is configured to selectively change a position or modulus property of the wing and/or central portions of the headrest.

A method for selectively reconfiguring a shape or modulus property of a headrest extending from a seatback comprises activating an active material with an activation signal, wherein the active material is in operative communication with a headrest surface and is configured to undergo a change in at least one property upon receipt of the activation signal; and reconfiguring the headrest by changing a position or a modulus property of the headrest surface in response to the change in the at least one property.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
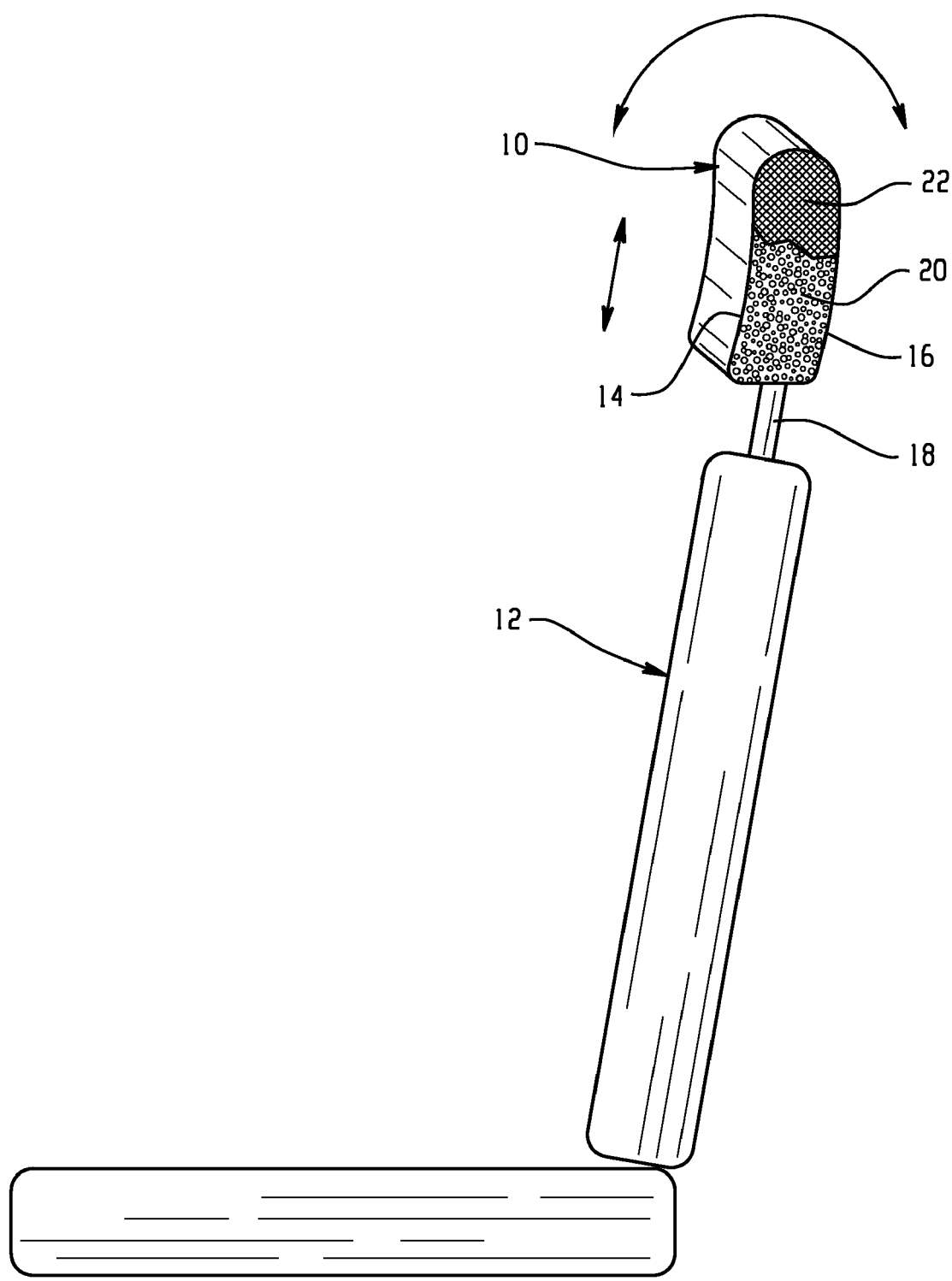
FIG. 1 illustrates a side elevation view of a seat back with a headrest.

Disclosed herein are headrest assemblies that include active material enabled mechanisms. The headrest assemblies can be selectively and actively positioned during use as may be desired for different triggering events and conditions. The headrest assemblies disclosed herein are adaptable as head restraints in any seat (including child seats). For example, the headrest assemblies can be employed in transportation vehicles (e.g., cars, trucks, airplanes, trains, and the like), furniture (e.g., entertainment and home seats (including add-ons)), stretchers, beds, head/neck positioning and constraining/restraining appliances and the like. Further, the headrest assemblies disclosed herein can be integral (i.e., a unitary structure) with a seat back or alternatively can be a separate component that can be added to the seat back.

The active material provides selective morphing, manipulation, positioning, and/or changing of the compliance of the headrest in response to an applied activation signal, wherein the application of the activation signal can be triggered either on demand or upon detection of a condition. The term "active material" as used herein generally refers to a material that exhibits a change in a property such as dimension, shape, phase, orientation, stiffness, shear strength and the like upon application of an activation signal. Suitable active materials include, without limitation, shape memory alloys (SMA), ferromagnetic shape memory alloys (MSMA), shape memory polymers (SMP), piezoelectric materials, electroactive polymers (EAP), magnetorheological (MR) elastomers, electrorheological (ER) elastomers, ER fluids, MR fluids, and the like. In addition to these above noted materials, the term active materials is intended to also include shear thickening/thinning fluids (STF). Depending on the particular active material, the activation signal can take the form of, without limitation, an electric current, an electric field (voltage), a temperature change, a magnetic field, a mechanical loading or stressing, and the like. Of the above noted materials, SMA and SMP based assemblies preferably include a return mechanism to restore the original geometry of the assembly. The return mechanism can be mechanical, pneumatic, hydraulic, pyrotechnic, or based on one of the aforementioned active materials.

Advantageously, the headrest assemblies described herein can be adapted to respond to a dynamic load of an occupant by the inertia provided in a triggering event to morph the headrest to reduce the space between the occupant and the headrest. As will be discussed throughout this disclosure, the various active material based actuators can be used to overcome many of the disadvantages of conventional actuators used in headrests. Most active material based devices that are envisioned for this use are more robust than strictly electromechanical approaches as they have no mechanical parts, it being the material itself that changes in stiffness and/or dimension. They also, in almost all cases, emit neither acoustic nor electromagnetic noise/interference.

Further, because of their small volume, low power requirements, and distributed actuation capability, among other attributes, the active material actuators can be embedded into the headrest at various locations such as the winged portions to allow customized tailoring for the needs of the occupant, the driving scenario, and/or the nature of an identified condition (e.g., another vehicle in a so-called "blind spot"). The active material actuators can also be actuated in a certain sequence or just in select locations to match occupant and situational needs. For example, different regions could be activated to meet the differing needs of an occupant (e.g., an occupant who wants to rest/sleep compared to one who desires to be alert and attentive). It is to be noted that other potential functions for active material enabled headrest features are also envisioned. Examples include, but are not limited to, alerting the driver of various conditions, such as the presence of a vehicle in one's blind spot, for example, when one activates the turn signal or starts to turn the wheel for a lane change, and the like. In other embodiments, it is comprehended that differences in the frequency and/or amplitude of vibration as well as in the stiffness/material modulus can also be used as massage mechanisms.

To better understand the various ways in which active materials can be employed to reversibly reconfigure and conform the headrest to a particular occupant's head or for a particular use/event, it is necessary to understand the nature and mechanics of the desirable active materials. As used herein the terms "active materials" or "smart material" shall mean shape memory alloys ("SMAs"; e.g., thermal and stress activated shape memory alloys and magnetic shape memory alloys (MSMA)), electroactive polymers (EAPs) such as dielectric elastomers, ionic polymer metal composites (IPMC), piezoelectric materials (e.g., polymers, ceramics), and shape memory polymers (SMPs), shape memory ceramics (SMCs), baroplastics, magnetorheological (MR) materials (e.g., fluids and elastomers), electrorheological (ER) materials (e.g., fluids, and elastomers), any other naturally occurring or man made material that exhibits a change in physical or chemical property upon engagement of an activation signal, composites of the foregoing active materials with non-active materials, systems comprising at least one of the foregoing active materials, and combinations comprising at least one of the foregoing active materials. For convenience and by way of example, reference herein will be made to shape memory alloys and shape memory polymers. The shape memory ceramics, baroplastics, and the like, can be employed in a similar manner. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

The ability of shape memory materials to return to their original shape upon the application or removal of external stimuli has led to their use in actuators to produce force/apply force resulting in desired motion. Active material actuators offer the potential for a reduction in actuator size, weight, volume, cost, noise and an increase in robustness in comparison with traditional electromechanical and hydraulic means of actuation. Ferromagnetic SMA's, for example, exhibit rapid dimensional changes of up to several percent in response to (and proportional to the strength of) an applied magnetic field. However, these changes are one-way changes and use the application of either a biasing force or a field reversal to return the ferromagnetic SMA to its starting configuration.

Shape memory alloys are alloy compositions with at least two different temperature-dependent phases or polarity. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is often called the austenite finish temperature (Af). When the shape memory alloy is in the austenite phase and is cooled, it begins to change into the martensite phase, and the temperature at which this phenomenon starts is often referred to as the martensite start temperature (Ms). The temperature at which austenite finishes transforming to martensite is often called the martensite finish temperature (Mf). The range between As and Af is often referred to as the martensite-to-austenite transformation temperature range while that between Ms and Mf is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below As). Subsequent heating above the austenite start temperature causes the deformed shape memory material sample to begin to revert back to its original (non-stressed) permanent shape until completion at the austenite finish temperature. Thus, a suitable activation input or signal for use with shape memory alloys is a thermal activation signal having a magnitude that is sufficient to cause transformations between the martensite and austenite phases.

The temperature at which the shape memory alloy remembers its high temperature form (i.e., its original, non-stressed shape) when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase a lower elastic modulus than in the austenite phase is observed. Shape memory alloys in the martensite phase can undergo large deformations by realigning the crystal structure arrangement with the applied stress. The material will retain this shape after the stress is removed. In other words, stress induced phase changes in SMA are two-way by nature; application of sufficient stress when an SMA is in its austenitic phase will cause it to change to its lower modulus martensitic phase. Removal of the applied stress will cause the SMA to switch back to its austenitic phase, and in so doing, recovering its starting shape and higher modulus. The mechanical properties of the shape memory alloy vary greatly over the temperature range spanning their transformation, typically providing the headrest with shape memory effects, superelastic effects, and high damping capacity.

Exemplary shape memory alloy materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and so forth. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to those needed to deform the material), which can be as high as the inherent yield strength of the austenite material, sometimes up to three or more times that of the deformed martensite phase. For applications that require a large number of operating cycles, a strain of less than or equal to 4% or so of the deformed length of wire used can be obtained. In experiments performed with shape memory alloy wires of 0.5 millimeter (mm) diameter, the maximum strain in the order of 4% was obtained. This percentage can increase up to 8% for thinner wires or for applications with a low number of cycles.

MSMAs are alloys, often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

As previously mentioned, other exemplary shape memory materials are shape memory polymers (SMPs). "Shape memory polymer" generally refers to a polymeric material, which exhibits a change in a property, such as a modulus, a dimension, a coefficient of thermal expansion, the permeability to moisture, an optical property (e.g., transmissivity), or a combination comprising at least one of the foregoing properties in combination with a change in its a microstructure and/or morphology upon application of an activation signal. Shape memory polymers can be thermoresponsive (i.e., the change in the property is caused by a thermal activation signal delivered either directly via heat supply or removal, or indirectly via a vibration of a frequency that is appropriate to excite high amplitude vibrations at the molecular level which lead to internal generation of heat), photoresponsive (i.e., the change in the property is caused by an electromagnetic radiation activation signal), moisture-responsive (i.e., the change in the property is caused by a liquid activation signal such as humidity, water vapor, or water), chemo-responsive (i.e. responsive to a change in the concentration of one or more chemical species in its environment; e.g., the concentration of H+ ion—the pH of the environment), or a combination comprising at least one of the foregoing.

Generally, SMPs are phase segregated co-polymers comprising at least two different units, which can be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment can be (semi-) crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it can be possible to demonstrate multiple permanent shapes. Similarly using a layered or composite approach, a combination of multiple SMPs will demonstrate transitions between multiple temporary and permanent shapes. While SMPs can be used variously in sheet, slab, fiber, or foam forms to adjust/control headrest stiffness, they do have the downside that they require continuous power to remain in their lower modulus shape. They are thus better suited for reversible shape, position, and orientation setting of the headrest (through heat/cool/reheat cycles) based on occupant preferences.

The shape memory material may also comprise a piezoelectric material. Also, in certain embodiments, the piezoelectric material can be configured as an actuator for providing rapid deployment. As used herein, the term "piezoelectric" is used to describe a material that mechanically deforms (changes shape) when a voltage potential is applied, or conversely, generates an electrical charge when mechanically deformed. Piezoelectrics exhibit a small change in dimensions when subjected to the applied voltage, with the response being proportional to the strength of the applied field and being quite fast (capable of easily reaching the thousand hertz range). Because their dimensional change is small (e.g., less than 0.1%), to dramatically increase the magnitude of dimensional change they are usually used in the form of piezo ceramic unimorph and bi-morph flat patch actuators that are constructed so as to bow into a concave or convex shape upon application of a relatively small voltage. The morphing/bowing of such patches within the liner of the holder is suitable for grasping/releasing the object held.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Exemplary piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of polymers include poly(sodium 4-styrenesulfonate) ("PSS"), poly(Poly(vinylamine) backbone azo chromophore), and their derivatives; polyfluorocarbines, including polyvinylidene fluoride ("PVDF"), its co-polymer vinylidene fluoride ("VDF"), trifluoroethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly (methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetraamines; polyimides, including Kapton® molecules and polyetherimide ("PEI"), and their derivatives; all of the membrane polymers; poly (N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains; as well as combinations comprising at least one of the foregoing.

Further, piezoelectric materials can include Pt, Pd, Ni, T, Cr, Fe, Ag, Au, Cu, and metal alloys comprising at least one of the foregoing, as well as combinations comprising at least one of the foregoing. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and combinations comprising at least one of the foregoing; and Group VIA and IIB compounds, such as CdSe, CdS, GaAs, $AgCaSe_2$, ZnSe, GaP, InP, ZnS, and combinations comprising at least one of the foregoing.

MR fluids is a class of smart materials whose rheological properties can rapidly change upon application of a magnetic field (e.g., property changes of several hundred percent can be effected within milliseconds), making them quite suitable in locking in (constraining) or allowing the relaxation of shapes/deformations through a significant change in their shear strength, such changes being usefully employed with grasping and release of objects in embodiments described herein. Exemplary shape memory materials also comprise magnetorheological (MR) and ER polymers. MR polymers are suspensions of micrometer-sized, magnetically polarizable particles (e.g., ferromagnetic or paramagnetic particles as described below) in a polymer (e.g., a thermoset elastic polymer or rubber). Exemplary polymer matrices include poly-alpha-olefins, natural rubber, silicone, polybutadiene, polyethylene, polyisoprene, and combinations comprising at least one of the foregoing.

The stiffness and potentially the shape of the polymer structure are attained by changing the shear and compression/tension module by varying the strength of the applied magnetic field. The MR polymers typically develop their structure when exposed to a magnetic field in as little as a few milliseconds, with the stiffness and shape changes being proportional to the strength of the applied field. Discontinuing the exposure of the MR polymers to the magnetic field reverses the process and the elastomer returns to its lower modulus state.

MR fluids exhibit a shear strength which is proportional to the magnitude of an applied magnetic field, wherein property changes of several hundred percent can be effected within milliseconds. Although these materials also face the issues packaging of the coils necessary to generate the applied field, they can be used as a locking or release mechanism, for example, for spring based grasping/releasing.

Suitable MR fluid materials include ferromagnetic or paramagnetic particles dispersed in a carrier, e.g., in an amount of about 5.0 volume percent (vol %) to about 50 vol % based upon a total volume of MR composition. Suitable particles include iron; iron oxides (including $Fe_2O_3$ and $Fe_3O_4$); iron nitride; iron carbide; carbonyl iron; nickel; cobalt; chromium dioxide; and combinations comprising at least one of the foregoing; e.g., nickel alloys; cobalt alloys; iron alloys such as stainless steel, silicon steel, as well as others including aluminum, silicon, cobalt, nickel, vanadium, molybdenum, chromium, tungsten, manganese and/or copper.

The particle size should be selected so that the particles exhibit multiple magnetic domain characteristics when subjected to a magnetic field. Particle diameters (e.g., as measured along a major axis of the particle) can be less than or equal to about 1,000 micrometers (μm) (e.g., about 0.1 micrometer to about 1,000 micrometers), or, more specifically, about 0.5 to about 500 micrometers, and more specifically, about 10 to about 100 micrometers.

The viscosity of the carrier can be less than or equal to about 100,000 centipoise (cPs) (e.g., about 1 cPs to about 100,000 cPs), or, more specifically, about 1 cPs to about 10,000 cPs, or, even more specifically, about 1 cPs to about 1,000 centipoise. Possible carriers (e.g., carrier fluids) include organic liquids, especially non-polar organic liquids. Examples include oils (e.g., silicon oils, mineral oils, paraffin oils, white oils, hydraulic oils, transformer oils, and synthetic hydrocarbon oils (e.g., unsaturated and/or saturated)); halogenated organic liquids (such as chlorinated hydrocarbons, halogenated paraffins, perfluorinated polyethers and fluorinated hydrocarbons); diesters; polyoxyalkylenes; silicones (e.g., fluorinated silicones); cyanoalkyl siloxanes; glycols; and combinations comprising at least one of the foregoing carriers.

Aqueous carriers can also be used, especially those comprising hydrophilic mineral clays such as bentonite or hectorite. The aqueous carrier can comprise water or water comprising a polar, water-miscible organic solvent (e.g., methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like), as well as combinations comprising at least one of the foregoing carriers. The amount of polar organic solvent in the carrier can be less than or equal to about 5.0 vol % (e.g., about 0.1 vol % to about 5.0 vol %), based upon a total volume of the MR fluid, or, more specifically, about 1.0 vol % to about 3.0%. The pH of the aqueous carrier can be less than or equal to about 13 (e.g., about 5.0 to about 13), or, more specifically, about 8.0 to about 9.0.

When the aqueous carriers comprises natural and/or synthetic bentonite and/or hectorite, the amount of clay (bentonite and/or hectorite) in the MR fluid can be less than or equal to about 10 percent by weight (wt %) based upon a total weight of the MR fluid, or, more specifically, about 0.1 wt % to about 8.0 wt %, or, more specifically, about 1.0 wt % to about 6.0 wt %, or, even more specifically, about 2.0 wt % to about 6.0 wt %.

Optional components in the MR fluid include clays (e.g., organoclays), carboxylate soaps, dispersants, corrosion inhibitors, lubricants, anti-wear additives, antioxidants, thixotropic agents, and/or suspension agents. Carboxylate soaps include ferrous oleate, ferrous naphthenate, ferrous stearate, aluminum di- and tri-stearate, lithium stearate, calcium stearate, zinc stearate, and/or sodium stearate; surfactants (such as sulfonates, phosphate esters, stearic acid, glycerol monooleate, sorbitan sesquioleate, laurates, fatty acids, fatty alcohols, fluoroaliphatic polymeric esters); and coupling agents (such as titanate, aluminate, and zirconate); as well as combinations comprising at least one of the foregoing. Polyalkylene diols, such as polyethylene glycol, and partially esterified polyols can also be included.

Electrorheological fluids (ER) fluids are similar to MR fluids in that they exhibit a change in shear strength when subjected to an applied field, in this case a voltage rather than a magnetic field. Response is quick and proportional to the strength of the applied field. It is, however, an order of magnitude less than that of MR fluids and several thousand volts are typically required.

Electronic electroactive polymers (EAPs) are a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. EAP morphing laminate sheets have been demonstrated. Their major downside is that they require applied voltages approximately three orders of magnitude greater than those required by piezoelectrics Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer and/or rubber that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties (e.g., copolymers comprising silicone and acrylic moieties, polymer blends comprising a silicone elastomer and an acrylic elastomer, and so forth).

Materials used as an electroactive polymer can be selected based on material propert(ies) such as a high electrical breakdown strength, a low modulus of elasticity (e.g., for large or small deformations), a high dielectric constant, and so forth. In one embodiment, the polymer can be selected such that is has an elastic modulus of less than or equal to about 100 MPa. In another embodiment, the polymer can be selected such that is has a maximum actuation pressure of about 0.05 megaPascals (MPa) and about 10 MPa, or, more specifically, about 0.3 MPa to about 3 MPa. In another embodiment, the polymer can be selected such that is has a dielectric constant of about 2 and about 20, or, more specifically, about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers can be fabricated and implemented as thin films, e.g., having a thickness of less than or equal to about 50 micrometers.

As electroactive polymers may deflect at high strains, electrodes attached to the polymers should also deflect without compromising mechanical or electrical performance. Generally, electrodes suitable for use can be of any shape and material provided that they are able to supply a suitable voltage to, or receive a suitable voltage from, an electroactive polymer. The voltage can be either constant or varying over time. In one embodiment, the electrodes adhere to a surface of the polymer. Electrodes adhering to the polymer can be compliant and conform to the changing shape of the polymer. The electrodes can be only applied to a portion of an electroactive polymer and define an active area according to their geometry. Various types of electrodes include structured electrodes comprising metal traces and charge distribution layers, textured electrodes comprising varying out of plane dimensions, conductive greases (such as carbon greases and silver greases), colloidal suspensions, high aspect ratio conductive materials (such as carbon fibrils and carbon nanotubes, and mixtures of ionically conductive materials), as well as combinations comprising at least one of the foregoing.

Exemplary electrode materials can include graphite, carbon black, colloidal suspensions, metals (including silver and gold), filled gels and polymers (e.g., silver filled and carbon filled gels and polymers), and ionically or electronically conductive polymers, as well as combinations comprising at least one of the foregoing. It is understood that certain electrode materials may work well with particular polymers and may not work as well for others. By way of example, carbon fibrils work well with acrylic elastomer polymers while not as well with silicone polymers.

Magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferromagnetic solids (e.g., Terfenol-D). These materials possess a very fast response capability, with the strain proportional to the strength of the applied magnetic field, and they return to their starting dimension upon removal of the field. However, these materials have maximum strains of about 0.1 to about 0.2 percent.

Shear thickening is the name given to the phenomena where the viscosity of a fluid increases with increasing shear rate (or equivalently, stress). Shear thickening can occur with relatively large magnitudes, to the point that the fluid can behave like a solid and fracture. Shear thickening is a non-Newtonian flow behavior. On the other hand, shear-thinning fluids are non-Newtonian as well, as their viscosities decrease as the applied shearing stress increases. The advantage of these fluids (in comparison with the MR or ER fluids) is that they do not require an external field.

FIG. 1 illustrates an exemplary headrest 10 for a seatback 12. The headrest 10 includes a front contact surface 14 and a back portion 16. The front contact surface 14 is the portion of the headrest 10 proximate to an occupant's head whereas the back portion 16 is the portion of the headrest distally located relative to the occupant's head. The headrest 10 itself is supported on at least one structural support post 18 slidably disposed within the seatback 12. The headrest generally includes a padding material 20 encased by an outer covering 22, which helps define the overall shape of the headrest, and may be in pivotable communication with the structural support post 18. The covering 22 defines surface 14.

It is noted that the structural support posts 18 can take any form or configuration in any of the headrests assemblies disclosed herein and are not intended to be limited to that shown. For example, a wishbone or goal post type structure can be used. Moreover, in some embodiments, more than two posts can be employed. In addition to posts, those skilled in the art will recognize a variety of other techniques and members that may be employed within the scope of the claimed invention to operatively connect a headrest to a seatback, such as lockable hinges, brackets, etc. Furthermore, and within the scope of the claimed invention, a headrest that is operatively connected to a seatback may be an integral part of a seatback portion as understood by those skilled in the art. For example, a headrest may be the upper portion of a seatback Still, in other embodiments, the headrest 10 may further include winged portions that are configured to contact a portion of an occupant's head upon lateral movement thereof. As will be described herein, the active material actuators are positioned and in operative communication with various portions of the headrest to customize the headrest to an occupant's head as well as to provide predetermined headrest configurations in response to different detected conditions.

Figure 2:
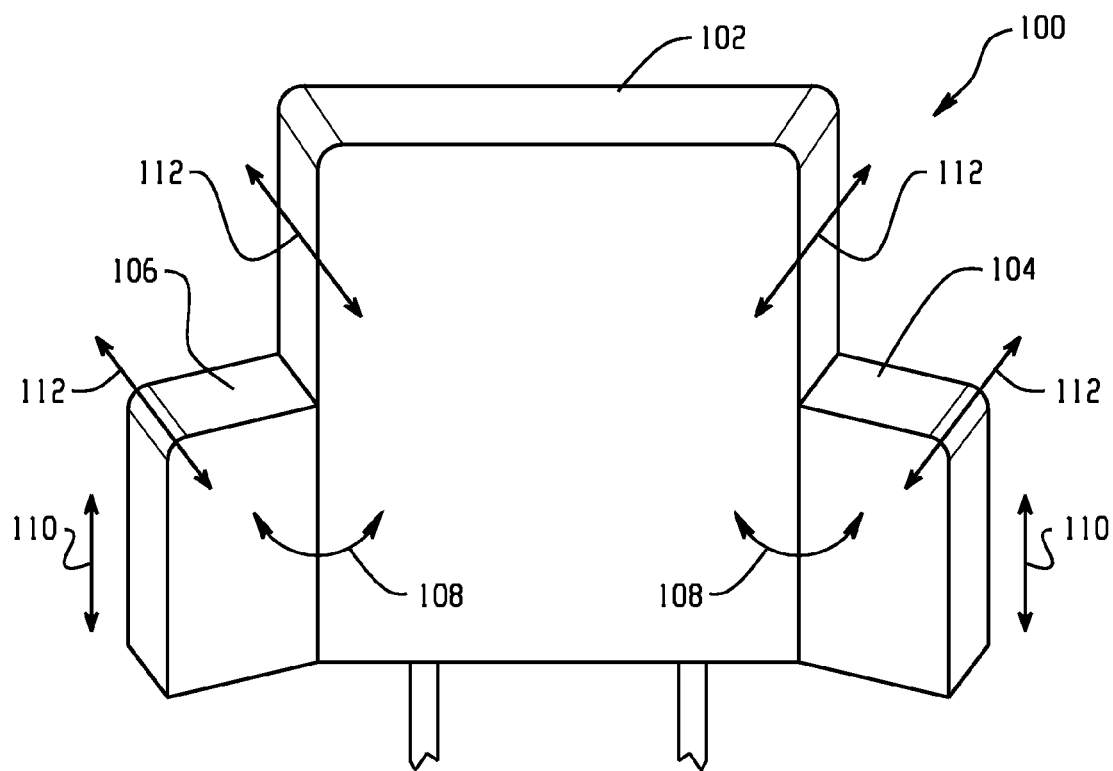
FIG. 2 illustrates a front view of the headrest in accordance with one embodiment of the present disclosure.

Referring now to FIG. 2, a headrest, generally designated 100, is illustrated. In one embodiment, the headrest 100 comprises a central portion 102 in operable communication with adjustable wing portions 104 and 106. The central portion 102 can supportably engage a back portion of an occupant's head, while adjustable wing portions 104 and 106 can supportably engage side portions of an occupant's head. In one embodiment, the central portion 102 is coupled to the wing portions 104 and 106 via hinges (see FIG. 3) that allow the rotation/tilting of the wing portions 104 and 106 relative to the central portion 102 as indicated by arrows 108, 110, 112 (i.e., movement in the x, y, z planes). In this manner, the central portion and/or wing portions can be positioned forward, backward, upwards, downwards, folded, flexed, twisted, inflated, or contoured and/or tilted at various angles as may be desired for different conditions. The ability of the central portion 102 and the wing portions 104, 106 to be easily movable allows a wide range of headrest positions with respect to a seatback that can be set on demand. Adjustment of the headrest position can be based on the load exerted on the seat assembly (e.g., the load exerted on the headrest assembly 100), manual positioning, active positioning by activation of the active material as will be discussed in greater detail below, and the like.

Figure 3:
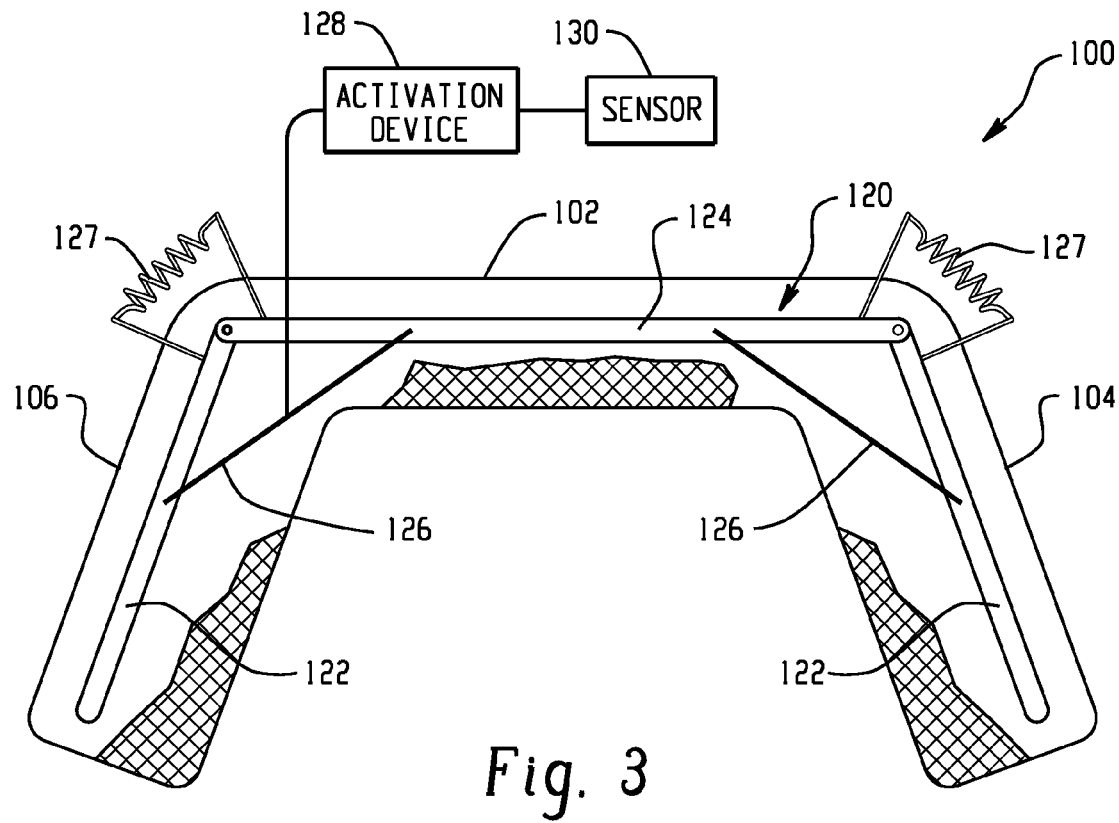
FIG. 3 illustrates a top down sectional view of a headrest in accordance with one embodiment of the present disclosure.

FIG. 3 illustrates a top down view of the headrest of FIG. 2 illustrating one embodiment of an active material actuator 120 for effecting movement of the wing portions 104, 106 relative to the central portion 102. The actuator 120 includes rigid members 122 of wing portions that are in hinged communication with rigid member 124 of the central portion 102. An active material 126, for example, a wire, strip, spring, or torque tube formed of a shape memory alloy, is configured to effect movement of the rigid member 122 relative to rigid member 124 upon receipt of an activation signal. In this manner, an occupant's head can be wrapped with the wings to provide greater support and comfort regardless of the occupant's head size. Activation of the shape memory alloy with an activation device 128 results in a decrease in the length dimensions of the wire/strip/spring causing the rigid members 122 of the wing portion to flex inward towards the occupant. Optionally, the active material can be selected and/or configured such that activation causes an outward flexure of the wing portions relative to an occupant. A bias spring can be used to provide a restoring force to wing portions upon deactivation of the active material.

In this embodiment, the wing portions 104 and 106 can be configured to rotate, which can be effected by actuation by SMA wires 126. The framing members (124) of the central portion 102 are in operable communication with framing members (122) of the respective wing portions 104 and 106 via the pivot points. One SMA wire 126 operatively interconnects the framing members 124 of the central portion 102 and the framing members 122 of wing portion 104; another SMA wire 126 operatively interconnects the framing members 124 of the central portion 102 and the framing members 122 of wing portion 106. The SMA wires can be attached directly from any point on the frame 124 to any point on the respective frames 122 of the wing portions. SMA wires 126 may also be connected to frame members 124, 122 indirectly within the scope of the claimed invention.

As electric current (or any other thermal activation method) is supplied to the SMA wires 126, the SMA warms up until the martensite-to-austenite transition temperature is reached. As the transformation takes place, the pre-strained wires contract forcing the wings to rotate towards the occupant. In one embodiment, bias springs 127, designed with a low stiffness comprising an inactive material, can be operatively connected to resist the restoring force of the SMA wires 126 in order to limit the amount of force exerted by the wing portions 104 and 106. Springs 127 are depicted in parallel with the SMA wires 126. In an alternative embodiment, the springs 127 are in series with the SMA wires 126. For example, each of the SMA wires 126 may be connected to frame members 124 by a respective spring.

In some embodiments, a sensor 130 can be used in combination with an activation device to provide the applied field upon a triggering event or condition. For example, various sensors such as pressure sensors, position sensors (capacitance, ultrasonic, radar, camera, and the like), displacement sensors, velocity sensors, accelerometers, and the like can be located in and about the vehicle seat and headrest in operative communication with a controller for regulating and activating the active material actuator 120 to effect the desired amount of headrest morphing. A pre-setting occupant identification feature could be programmed in a manner equivalent to a seat memory selection switch.

In some embodiments, a locking mechanism can be used to hold the activated position so that the headrest will remain in that position when the activation signal is turned off thus helping to dramatically reduce the power requirements for device operation. Upon deactivation of the signal and/or release of the locking mechanism, the winged portions 104, 106 are pushed outwards with the bias springs deforming or helping to deform the shape memory alloy materials back to the martensite state. The headrest locking/latching mechanism can be actuated mechanically, electrically using a motor, hydraulically, and/or pneumatically. Mechanisms to control the forces exerted by the wings portions 104, 106 can include springs or hydraulic systems to maintain a positive force from the wing portions 104, 106 once the headrest reaches the desired position.

In another embodiment, the various configurations of the headrest can be provided by distributing several wires (conduits or ribbons) of shape memory alloy form along the portion that needs to be moved (e.g., the central and/or wing portions). For example, an elastic plate with SMA embedded along the plate can be employed.

Figure 4:
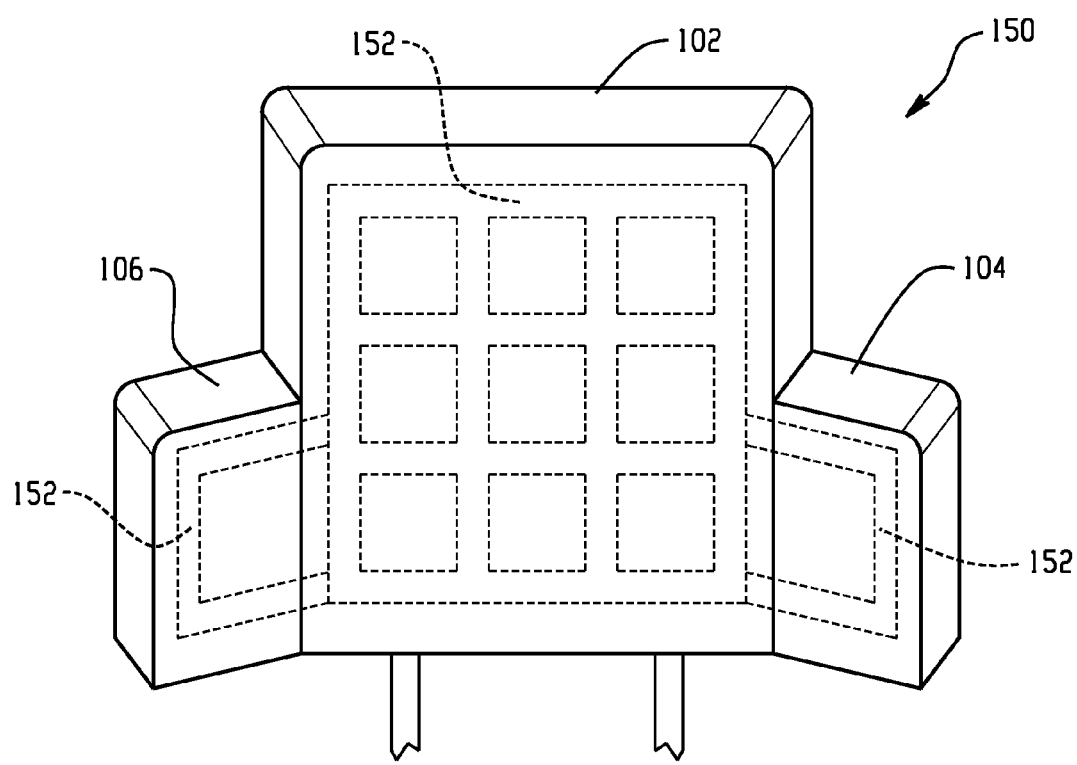
FIG. 4 illustrates a top down sectional view of a headrest in accordance with one embodiment of the present disclosure.

FIG. 4 illustrates an end-on view of an active material based headrest assembly in accordance with another embodiment. The headrest assembly 150 includes a frame formed of interconnecting members 152 comprised of the active material. For example, one or more of the interconnecting members can be formed in its entirety of shape memory alloy, shape memory polymer, piezoelectric, and the like, or may be disposed within an elastic sleeve for containing the active material such as an electrorheological fluid, magnetorheological fluid, shear thickening or thinning fluid, and the like. The members 152 can be of any suitable form including, but not limited to, rods, bands, flat members, and the like. With regard to the flat members, these can take the form of single or multiple plates. The interconnecting members 152 are configured to change shape and/or its modulus properties upon activation. Also, in some embodiments, the frame may be reinforced with framing members that do not comprise active materials.

The interconnecting members 152 may be individually activated, activated by groups, or collectively activated depending on the configuration desired for the particular condition. It should be apparent that the wing portions 104, 106 could include the frame 152 comprised of the active material and be independently controlled or integrated with the central portion 102.

As noted above, several mechanism can be employed to lock the desired orientation/configuration of the headrest assembly. These mechanisms can be varied but the main idea is that the passenger controls when to 'open' or release the lock via, for instance, a button control and by releasing the button is able to lock the head rest in its position, except when conditions cause an over-ride and the headrest is reconfigured to a defined state.

In operation of a headrest 150 comprising members 152 formed of shape memory alloys, the stress caused by the force applied on the desired part of the headrest causes the deformation of the SMA material frame on the desired part as the stress-induced austenite to martensite transformation occurs. The stability of the martensite phase is maintained when the passenger releases the engaging device (e.g., a button), thereby locking the part in place via the latching/locking mechanism. The locking/latching mechanism can be actuated mechanically, electrically using a motor, for instance, hydraulically or pneumatically. The releasing and locking of the latching/holding mechanism can happen as desired by the occupant or, alternatively, it can happen automatically through a control system based on sensor inputs of some aspects of the vehicle's state.

Figure 5:
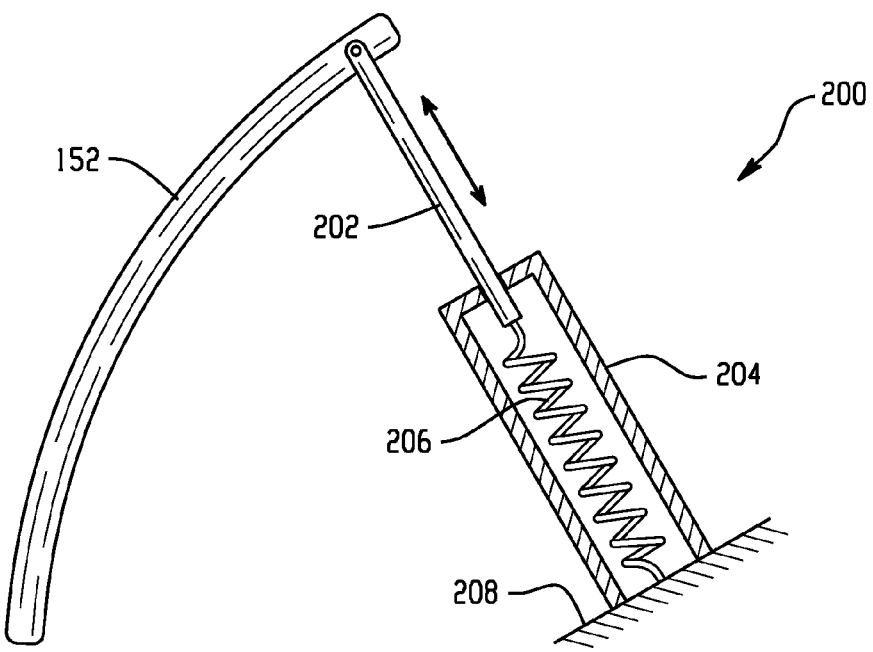
FIG. 5 illustrates a side sectional view of a headrest and frame formed of an active material in accordance with an embodiment.

FIG. 5 illustrates a lock mechanism in accordance with one embodiment. The lock mechanism includes an actuator 200, e.g., hydraulic, pneumatic, or motor controlled, which is operatively connected to one or more of the frames 152. The actuator 200 includes a translatable arm 202 slidably disposed within a housing 204. A bias spring 206 can be attached to the end of the arm disposed within the housing. The other end of the arm is connected to the framing member.

During a changing of the configuration of the headrest, the actuator arm 202 would translate as a function of movement of the interconnecting member(s) 152. The locking mechanism can be integrated so that once the active material is no longer activated the position is maintained. Accommodation could be made such that the connection point of the actuator rod 202 can be varied by allowing it to move in a guide (not shown) on the interconnection of frame/flat members. In such a case, the base of the actuator 200 can be connected to the seat ground by a joint that can allow this motion such as a ball joint, rather than a fixed connection. This variation increases the flexibility of the headrest for different passenger heights. It is noted that in this embodiment the connections of the actuator to the frame member 152 has been shown as a rod. Other linkages (to reduce actuator size for instance) could be used to effect this connection. The bias spring 206 could be incorporated with the actuator to supplement the return of the frame member to its nominal position once the load from the occupant is removed (the frame member would revert to its nominal position once the load is removed and the actuator is unlocked).

Figure 6:
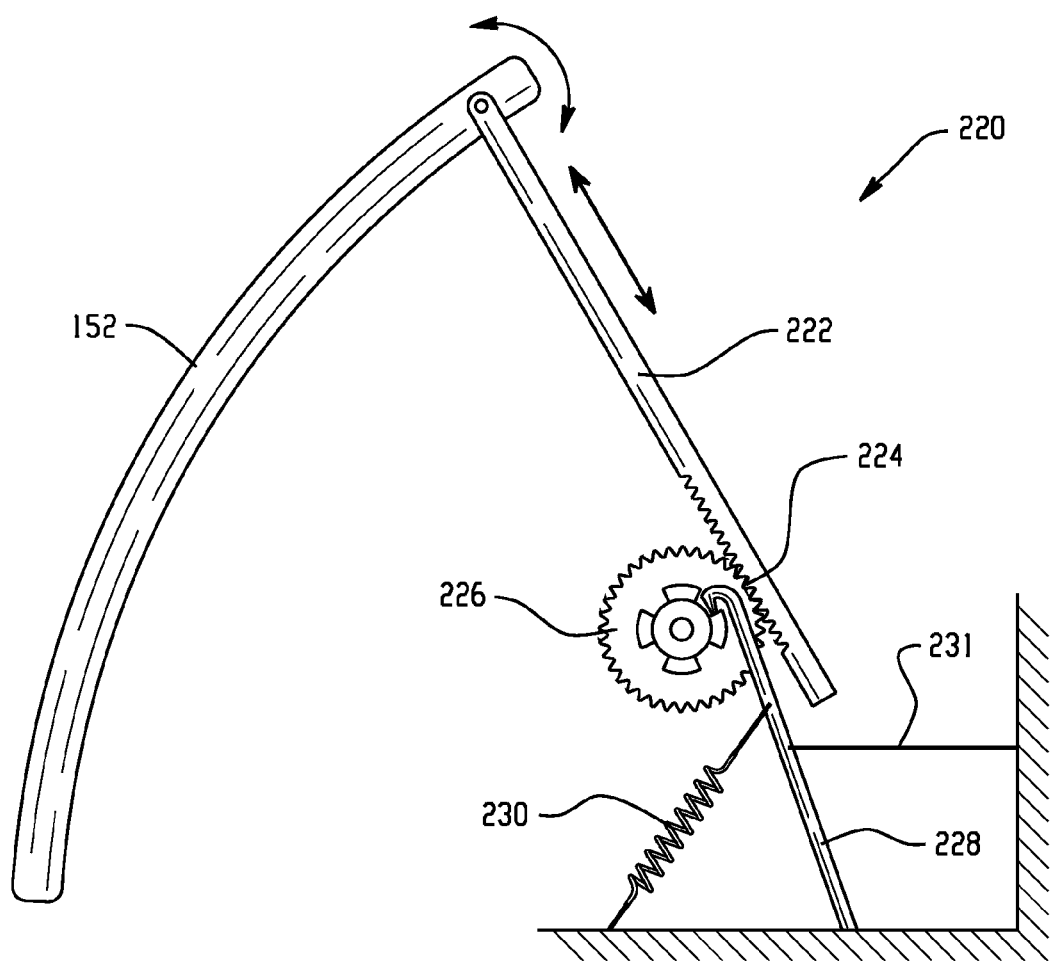
FIG. 6 illustrates a side sectional view of a headrest and frame formed of an active material in accordance with another embodiment

FIG. 6 illustrates yet another embodiment of a locking mechanism 220. The actuator includes a translatable arm 222 having a plurality of engageable portions 224, e.g., teeth. A gear 226 having a ratchet mechanism and pawl are in operative communication with the teeth to provide a means for locking the translatable arm in a fixed position. The pawl 228 in turn is releasable by the occupant via a button which pulls on it, via 231 against its return spring 230. When the button is released the return spring locks the ratchet thereby holding the position of the gear 226 and of the headrest.

Figure 7:
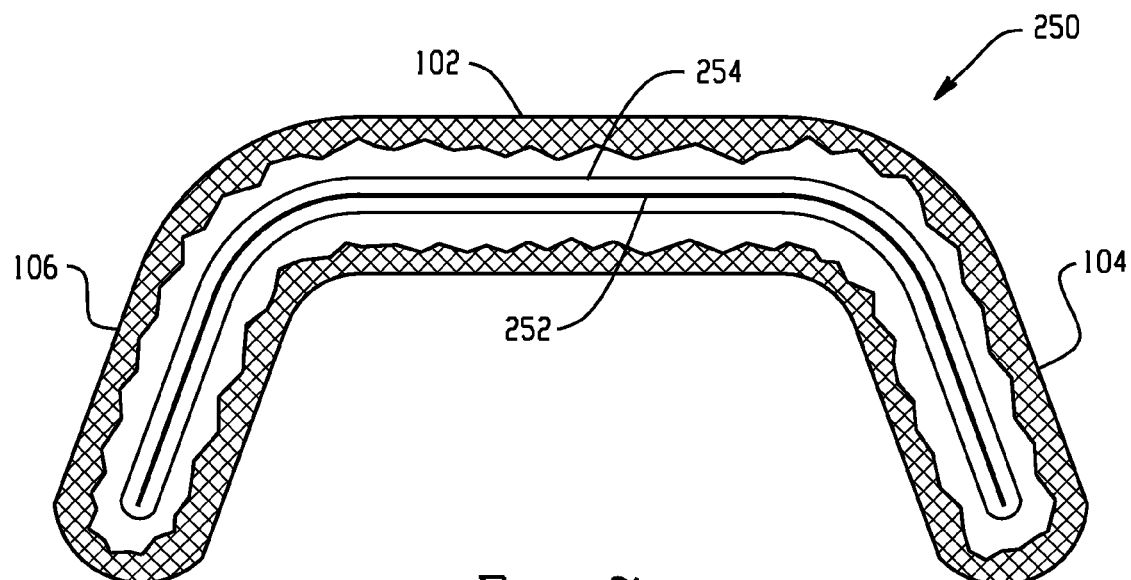
FIG. 7 illustrates a top down sectional view of a headrest in accordance with one embodiment of the present disclosure.

It is to be understood that the same or different latching/holding mechanism discussed in relation to central portion 102 can be employed in relation to wing portions 104, 106. For example, these mechanisms may be particularly useful in embodiments where the wing portions 104, 106 are moved/tilted in an up and down direction. Again, the releasing and locking of the latching/holding mechanism can happen as desired by the occupant or alternatively it can happen automatically for various considerations through a control system based on sensor inputs of some aspects of the vehicle's state. Referring now to FIG. 7, another embodiment of a headrest, generally designated 250 is illustrated. The headrest 250 comprises a "smart" composite plate. Numerous active materials can be employed. By way of example, the smart composite plate comprises an SMA wire/ribbon 252 embedded into a flexible elastic matrix 254. The smart composite plate forms a frame of the headrest 250. If the SMA wire 252 is located away from the neutral plane, contraction (by heating the wires with electric current) leads to bending of the smart composite plate. In one embodiment, the smart composite plate is a unitary structure that is disposed within the headrest 250 such that the smart composite plate is present in a central portion 102 and wing portions 104 and 106. More particularly, the smart composite plate is located in a position such that bending of the smart composite plate rotates the wings. The composite plate could be made of any homogeneous or heterogeneous elastic matrix where the SMA wires/ribbons are embedded in a preferential direction to induce controlled bending (with a desired curvature). The matrix can be an homogeneous materials or heterogeneous and it may include a composite material (with reinforcements), a layered material (including metal and plastic parts for example), etc.

Figure 8:
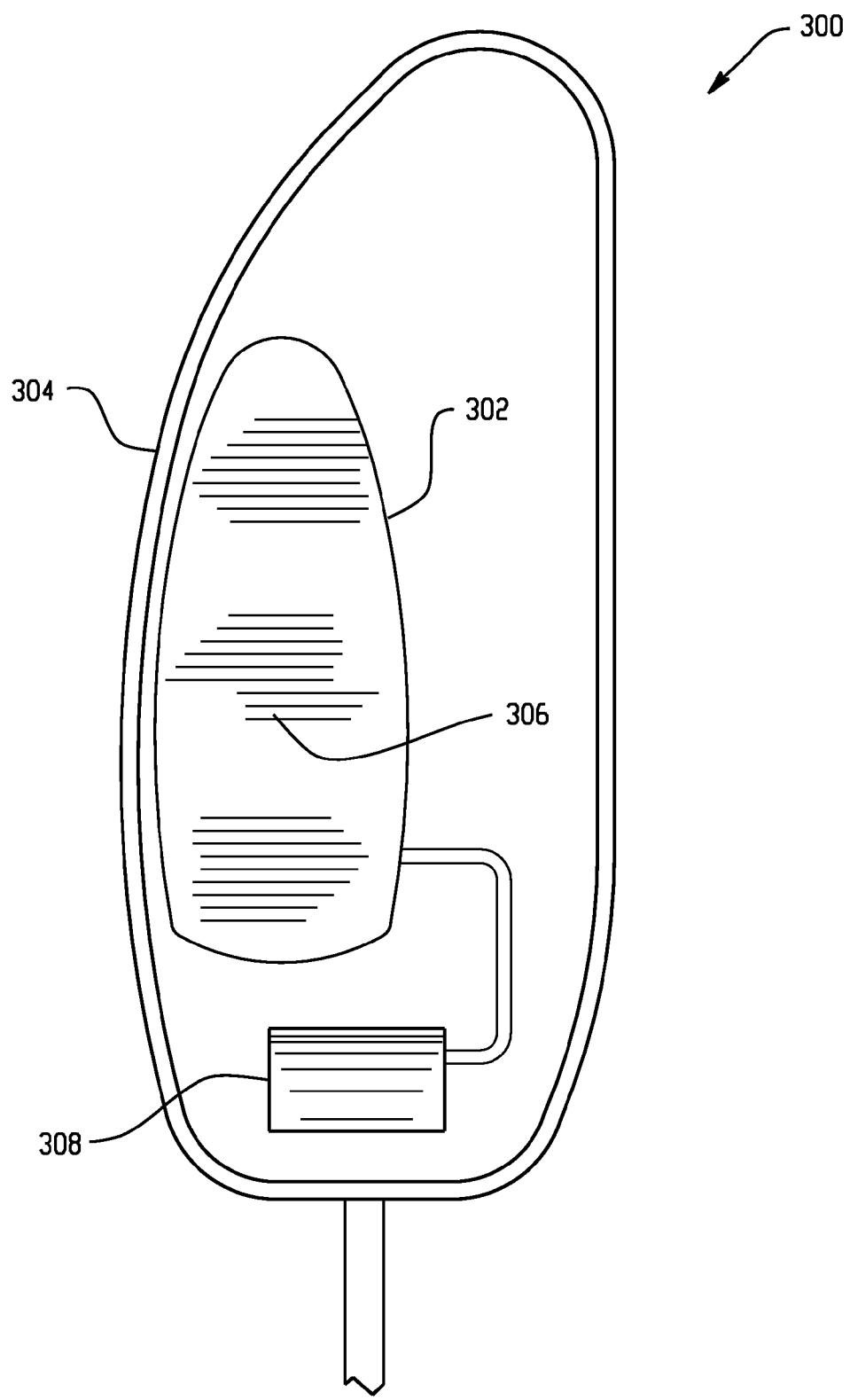
FIG. 8 illustrates a side sectional view of a headrest in accordance with another embodiment.

Referring now to FIG. 8, a headrest, generally designated 300, is illustrated. The headrest 300 comprises a bladder 302 located proximate to or on a contact surface 304 that is defined by a cover. A fluid 306 is disposed within the bladder 302. The bladder is disposed in fluid communication with a partially filled reservoir 308. The bladder 302 is positioned so that force applied to surface 304 of the headrest 300 is transmitted to the bladder 302 and the fluid 306 contained therein. In a first embodiment, fluid 306 is a shear thinning fluid. At small shear rates, the fluid can go back and forth from the reservoir without much effort. These shear thinning fluids will allow the headrest 300 to behave like any other solid, while providing comfort for the occupant. However, under high deformation rate (caused by force on surface 304), the viscosity of the shear thinning fluids is significantly reduced. In various embodiments, fluids with different viscosity properties can be distributed in different positions, shapes and sizes on the contact area of the headrest 300. In a second embodiment, fluid 306 is a shear thickening fluid, where the initial viscosity of the fluid will make the headrest soft, but its response to high deformation rates will make it harder to the point where the fluid will exhibit mechanical properties of a solid. In other embodiments, fluid 306 is an MR or ER fluid. It is to be understood that in various other embodiments piezoelectric based pumps can be used to pump traditional fluids (e.g., air, water, and the like) to bladders distributed on the surface of the headrest.

Figure 9:
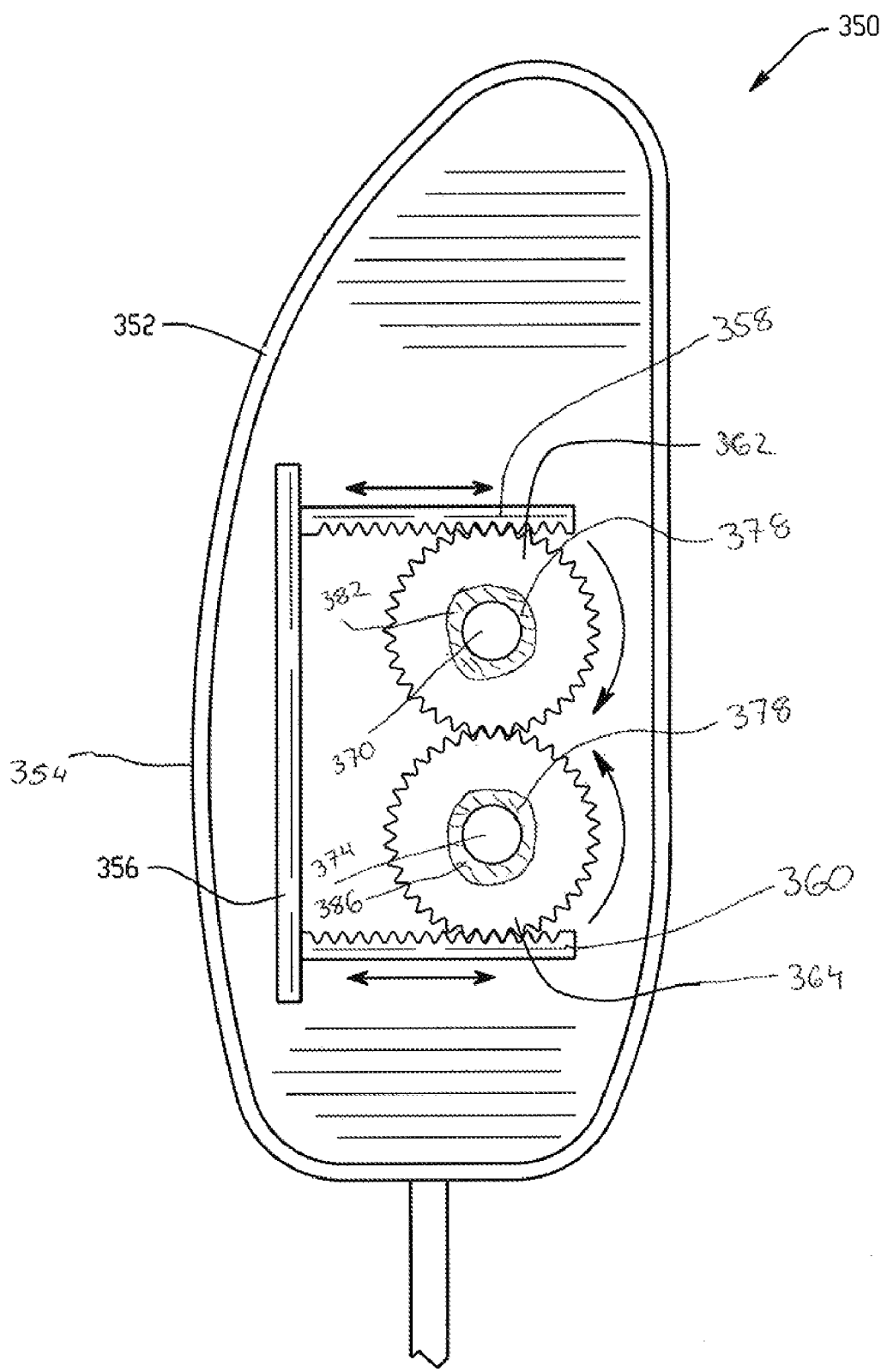
FIG. 9 illustrates a side sectional view of a headrest in accordance with another embodiment.

Referring now to FIG. 9, another embodiment of a headrest, generally designated 350 is illustrated. In this embodiment, a cover 352 defines outer surface 354 of the headrest 350. A movable member 356 is disposed within the headrest 350, and is rigidly connected to two racks 358, 360. Rack 358 includes teeth that are in meshing engagement with gear 362. Rack 360 includes teeth that are in meshing engagement with gear 364. Gears 362 and 364 are meshingly engaged with each other. Member 356 is positioned such that a force exerted on at least part of the outer surface 354 of the headrest 350 is transmitted to the member 356; accordingly, force on at least part of surface 354 will urge the movement of the member 356 and racks 358, 360, and, accordingly, the rotation of the gears 362, 364.

Gear 362 may be selectively rotatable about a first center member 370. Gear 364 may be selectively rotatable about a second center member 374. The first and second center members are cylindrical and rigidly fixed with respect to the structure of the headrest. Fluid 378 is disposed within an annular cavity 382 defined between gear 362 and the first center member 370. Fluid 378 is also disposed within an annular cavity 386 defined between gear 364 and the second center member 374. Accordingly, the viscosity of the fluid 378 affects the ability of the gears 362, 364 to rotate with respect to the first and second center members 370, 374, and correspondingly, affects the resistance of the member 356 to displacement of surface 354. In a first exemplary embodiment, fluid 378 is a shear thinning fluid. In a second exemplary embodiment, fluid 378 is a shear thickening fluid. In a third exemplary embodiment, fluid 378 is an MR fluid. In a fourth exemplary embodiment, fluid 378 is an ER fluid.

In each of the embodiments discussed above, active material can be disposed in a covering or form part of the covering of the headrest. An optional padding material can be disposed inside the covering in operable communication with the covering and the active material employed in the headrest. The optional padding can comprise an active material or an inactive material.

It is to be understood that in various other embodiments, combinations of different materials can be used to make active structures (e.g., composite/sandwich plates, hinges, frames, pivots, and the like). For instance, as discussed above, a shape memory alloy in any shape (wire, ribbons, and the like) can be embedded in an elastic matrix (polymer or any soft material) to improve protection of the wires and/or vibration control and energy absorption. Moreover, combinations of shape memory alloys and shape memory polymers provide a wide range of movements and ways to control them. Superelastic shape memory alloys are not only useful for energy absorption or places where large deformations are needed. Structures that need a high initial stiffness, but low force requirements to deform them can also be made of these materials (e.g., superelastic multiple-stable hinges for highly stable positions that do not require an excessive force/torque to change positions.

Further, while some applications of the headrest are discussed above, the use of active materials for reshaping and/or changing the modulus of the headrest has potentially wide application. Indeed, they can be used to aid the driver in conjunction with various sensor based comfort, convenience, and protection systems. Another advantage of using active materials is that they would permit personalization of the magnitude and/or nature of the changes effected in the headrest.

The active headrests disclosed herein can be employed in front seats, back seats, child seats, any seat in a car or vehicle transportation, including other industries like airlines, entertainment seats, home, and the like, head/neck positioning and constraining appliances inclusive of selling something in the after market, as an add-on that may be placed over or on something and functioning as a modifiable headrest for comfort. Other functions can include vibration (for example, with an EAP or piezoelectric patch), which can be used for massaging. Another application is snoozing headrests for child seats.

Advantageously, the headrests described herein are easily movable allowing a wide range of headrest positions that can be set on demand.

As used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

As set forth in the claims, various features shown and described in accordance with the different embodiments of the invention illustrated may be combined. While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of selectively reconfiguring a headrest extending from a seatback, the method comprising:
   activating an active material with an activation signal, wherein the active material is in operative communication with a headrest surface located at a first position and defining a first modulus property, and the material is operable to undergo a reversible change in at least one physical or chemical property upon receipt of the activation signal; and
   modifying the position or modulus property as a result of the change in the at least one property of the material,
   autonomously restoring the surface or enabling the surface to be restored to the first position or the first modulus property by deactivating the material.

2. The method of claim 1, wherein activating the active material with the activation signal comprises continuously applying the activation signal to the active material and maintaining a change in at least one feature of the headrest surface.

3. The method of claim 1, wherein the material property is selected from the group consisting essentially of shape, dimension, phase, shape orientation, stiffness, viscosity, shear strength and combinations thereof.

4. The method of claim 1, wherein activating the active material with the activation signal comprises applying a selected one of a thermal activation signal, an electric activation signal, a magnetic activation signal, a chemical activation signal, and a mechanical load.

5. The method of claim 1, further comprising locking the headrest after changing said at least one property of the active material so as to hold the modification in position or modulus property, and unlocking the headrest so as to restore the position or modulus property after deactivating the active material.

6. The method of claim 1, further comprising applying the activation signal to change the at least one property in the active material in response to a sensor input, wherein the sensor input is a detected condition.

* * * * *